United States Patent Office 3,016,708
Patented Jan. 16, 1962

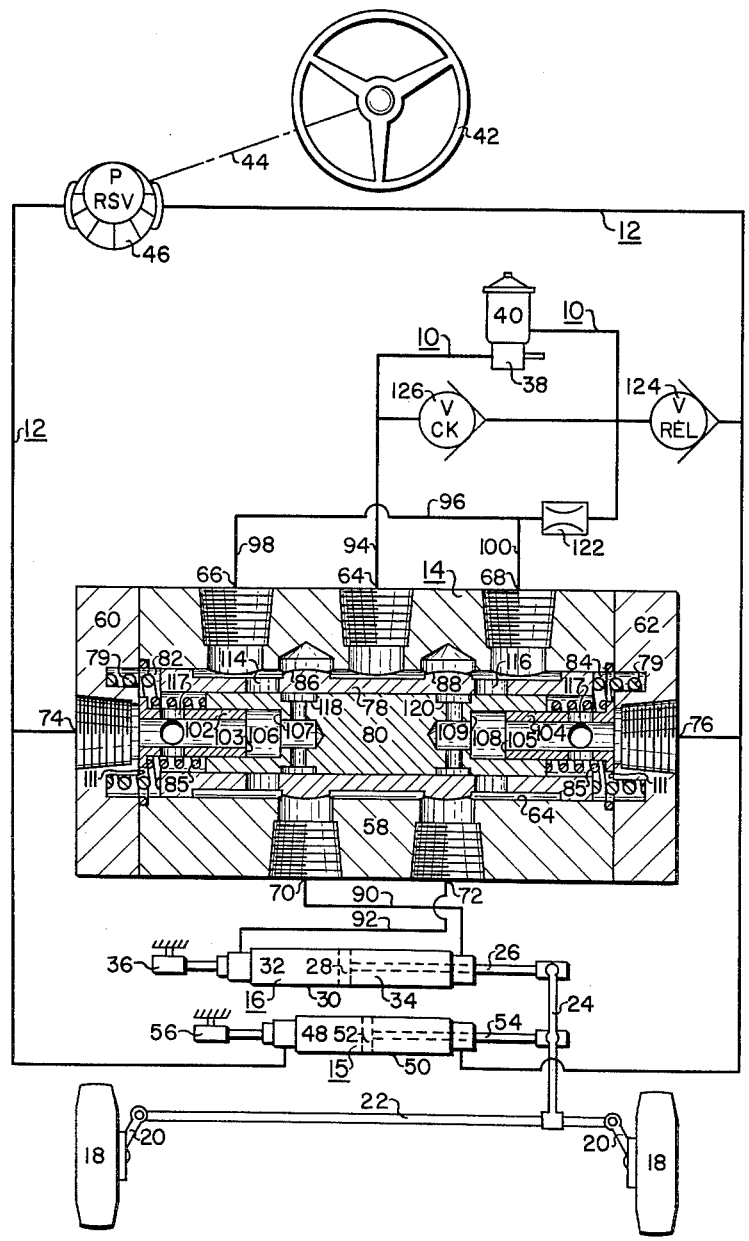

3,016,708
POWER TRANSMISSION
Richard O. Gordon, Ypsilanti, and John B. Keir, Madison Heights, Mich., assignors to Vickers Incorporated, Detroit, Mich., a corporation of Michigan
Filed Mar. 23, 1959, Ser. No. 801,150
16 Claims. (Cl. 60—52)

This invention relates to power transmissions, and is particularly applicable to those of the type comprising two or more fluid pressure energy translating devices, one of which may function as a pump and another as a fluid motor.

This invention is generally concerned with an all hydraulic steering system which combines manually and power operated, hydraulic systems for steering the dirigible wheels of a vehicle.

More particularly, the invention relates to power transmissions adapted for use in servo applications such as power steering the dirigible wheels of a vehicle or actuating a control surface of an aircraft or missile.

As the automobile and truck, both commercial and industrial, have become larger, it has increasingly become more difficult to steer the vehicles with the conventional method of steering wherein power steering is an assist to the standard mechanical steering gear. The manufacturers have in some cases lowered the floor of the vehicle and reduced the overall working space of the vehicle in order to obtain a larger and roomier interior for the passengers. Added accessories have further complicated the space problem and have imposed various location and space limitations on the power steering designer and engineer.

In order to overcome the critical location and space problem and to provide a steering system that is as effortless as possible to operate, we have invented an all hydraulic steering system which has resulted in the elimination of the heavy and inflexible mechanical steering gear, pitman arm, drag link, levers and related linkages and parts. This system has overcome many of the design limitations, especially in the industrial truck industry, and has permitted the designer and engineer more flexibility in locating the component parts of the system. The power cylinder or cylinders can be mounted in any position in order to obtain the best thrust. The design permits use of flexible hose hydraulic lines rather than expensive forgings for linkages. The all hydraulic steering system has further provided a more compact system with fewer components than the standard system.

Such a full power steering system may be of the type shown in the drawing wherein the conventional steering gear and drag link have been eliminated and replaced by standard hydraulic components employed in two cooperating hydraulic circuits, a power circuit and a control circuit. The power circuit consists in part of a power source, reservoir, control valve, and fluid motor, while the control circuit consists of a manual pump and a follow-up cylinder which is connected to the fluid motor. No reservoir or accumulator is employed in the closed control circuit, and any make-up fluid is obtained from the reservoir in the power circuit. One of the standard hydraulic components is a differential reversible follow-up cylinder previously mentioned. That is to say, a single rod piston rather than a double rod piston has been employed in the follow-up cylinder. This presents the problem of requiring more fluid in the control circuit when the piston is moving in the rod end direction and less fluid in the control circuit when the fluid is moving in the head end direction. Since the control circuit does not utilize an independent reservoir, it has been necessary to provide make-up fluid for the control circuit when the follow-up piston is moving in the rod end direction and to discharge fluid from the control circuit, equal to the displacement of the rod, when the follow-up piston is moving in the head end direction. This problem has been solved by employing a shuttle valve, as will be explained hereinlater.

It is an object of this invention to provide an improved low cost, all hydraulic power steering system which utilizes standard hydraulic components so as to provide a system which is precisely controlled, rugged, compact and easy to maintain and disassemble for repairs.

It is a further object of this invention to provide an all hydraulic steering system wherein the conventional mechanical steering gear and related linkages have been eliminated.

Still a further object of this invention is to provide an all hydraulic steering system comprising a power steering circuit and a control and emergency hydraulic steering circuit which automatically comes into play to permit steering through the follow-up cylinder in the event of power failure in the power circuit.

Another object is to eliminate the need for an accumulator or reservoir in the control circuit.

Another object of this invention is to provide a system wherein the reservoir of the power steering pump in the power circuit becomes the reservoir for the manual pump in the control circuit when steering manually.

Still another object of the invention is to utilize a hydraulic connection to actuate the control valve hydraulically rather than mechanically.

A further object of this invention is to provide a novel control valve in the power circuit containing positive means for supplying make-up fluid to the control circuit from the power circuit for replenishing the control circuit.

Still another object of this invention is to utilize a novel type of control valve designed to handle the extra displacement in a closed control circuit when employing a reversible differential follow-up cylinder.

Further objects and advantages of the present invention will be apparent from the following description, reference being had to the accompanying drawing wherein a preferred form of the present invention is clearly shown.

In the drawing:

The drawing is a circuit diagram of the all hydraulic steering system showing the control valve in cross section.

Referring to the drawing, there is shown an all hydraulic steering system which comprises two cooperating hydraulic circuits, a power circuit 10 and a control circuit 12. The primary puropose of the control circuit 12 is to supply sufficient pressure to actuate the control valve 14. The primary purpose of the power circuit 10 is to deliver pressurized fluid through the control valve 14 to the fluid motor 16, which is of the differential and reversible type, so as to obtain the desired movement of the steered wheels 18. The steered wheels 18 are connected by knuckle arms 20 to the vehicle tie rod 22. A connecting arm 24 joins the tie rod 22 to the fluid motor 16 in a manner well-known in the art.

The piston 28 and rod 26 reciprocate within a cylinder 30, all cooperating to define the fluid motor 16. The piston 28 divides the cylinder 30 into a pair of chambers 32 and 34. The cylinder 30 is connected to the vehicle frame at 36, thereby permitting the piston 28 to move relative to the cylinder 30.

The power circuit 10 consists in part of a power pump 38 which has an integral volume control and relief valve, not shown, an oil reservoir 40 and a control valve 14. The power pump 38 may be of the type disclosed in the U.S. Patent No. 2,835,201 to R. B. Pettibone. The pump 38, which may be mounted in the vehicle engine compartment and belt driven from the crankshaft of the engine, not shown, delivers fluid under pressure to the fluid motor 16 under the direction and control of the control valve 14.

The control circuit 12 is manually influenced by the steering wheel 42 which has a driving connection schematically represented by the line 44, with the rotor of the manually operated, two-way actuator or vane pump 46. The follow-up cylinder 15 is also connected in the control circuit 12 and consists of a cylinder 50, and piston 52 and rod 54, which move in the cylinder 50. The cylinder 50 is fixed to the frame of the vehicle at 56. The follow-up cylinder 15 is also of the differential reversible type. The piston rod 54 is joined to the connecting arm 24. The follow-up cylinder 15 is provided for re-centering the control valve 14 and controlling the hydraulic system to cause the turning movement of the vehicle to follow closely the operation of the manually controlled steering element or wheel 42.

The control valve 14 consists of a valve body 58 which is sandwiched in between a pair of end caps 60 and 62. A longitudinal bore 64 is located in the body 58. A pressure port 64, a pair of return ports 66 and 68, and a pair of motor ports 70 and 72 are in fluid communication with the longitudinal bore 64. A pair of control ports 74 and 76 are located in the end caps 60 and 62 respectively and communicate with the bore 64 and with the control circuit 12.

A primary hollow valve member 78 is movable in the bore 64. A secondary valve member or shuttle valve 80 is axially slidable in the primary valve member 78, both of said members 78 and 80 defining at the outer ends of the bore 64 a pair of fluid chambers 82 and 84. Centering springs 79 are positioned in the fluid chambers and normally bias the valve member 78 to an open center condition. Centering springs 85 are positioned in the fluid chambers and bias the shuttle valve 80 to a normally neutral position. Centering springs 85 have a spring rate less than the rate of centering springs 79. The control port 76 is in continuous communication with the chamber 84, while the control port 74 is in constant communication with the chamber 82.

The primary valve member 78 has a pair of valving lands 86 and 88 which overlie the motor ports 70 and 72 respectively. Motor port 70 is connected with the rod end chamber 34 by a fluid line 90, while the other motor port 72 is connected to the head end chamber 32 by a flexible fluid connection 92. The inlet line 94 connects the power pump 38 with the inlet port 64, while a return line 96 having a pair of branches 98 and 100 connects the return ports 66 and 68 with the reservoir 40.

A pair of cylindrical combined spring guide and valve stop members 102 and 104 are positioned in the fluid chambers 82 and 84 respectively and abut the corresponding end cap. The secondary valve member 80 has cylindrical recesses 106 and 108 at the outer ends. The secondary valve member 80 slidably receives the stop members 102 and 104 in recesses 106 and 108 respectively, and the travel of spool 80 is limited by the inner end 103 or 105 of the stop members engaging either the stop surface 107 or 109. The primary valve member 78 has a pair of radial passage means 114 and 116, while the secondary valve member 80 has a pair of radial passage means 118 and 120. Travel of primary spool 78 is limited by abutment with the faces 111 of end caps 60 and 62.

In the centered position of the primary valve member 78, as shown, an open center condition exists. Pressure port 64 is in fluid communication with the return ports 66 and 68 across lands 86 and 88 respectively. It is also apparent that the motor ports 70 and 72 are connected to the return ports when the primary valve member 78 is in the centered position. Movement of the valve spool 78 in either direction will produce a pressure increase in one of the motor ports 70 and 72 in a manner well-known in the art, thus producing hydraulic steering effort at the fluid motor 16.

In operation, a counterclockwise rotation of the steering wheel 42 initially moves fluid in the control circuit 12 into the control port 76 and through radial passages 117 provided in the cylindrical stop member 104 and finally into the fluid chamber 84. The fluid in chamber 84 acts against the outer end of the primary valve member 78 and the secondary valve member 80. The control valve 14 is designed so that the secondary valve member 80 is shifted before the primary valve member 78. This sequence of operation is obtained because the centering springs 85 have a lower spring rate than the centering springs 79.

The secondary valve member 80 shifts to the left until it is prevented from doing so by the stop member 102. Continued turning of the wheel 42 increases the pressure in the chamber 84 so as to shift the primary valve member 78 to the left. The pressure required to shift valves 78 and 80 is a small fraction of that which would be required in chamber 50 to effect movement of the wheels 18. However, it is possible to steer the vehicle through cylinder 15, as will be hereinafter described.

Immediately upon the movement of the primary valve member 78 to the left, the fluid pump 38 is directed to the motor port 70 and on to the rod end chamber 34, thereby moving the piston 28 to the left. This movement causes the follow-up piston 52 to also move to the left. A greater amount of fluid is displaced from chamber 48 than is required to supply the inlet side of the fluid pump 46 when turning in the counterclockwise direction. The excess displacement is equal to the volume of the rod 54. Since both of the valves 78 and 80 have shifted to the left, and valve 80 has greater travel than valve 78, passage means 118 and 114 are in fluid communication with the fluid chamber 82 and return port 66, thereby permitting the excess fluid from the head end chamber 48 to escape from the control circuit 12 through the radial passage means 118 and 114 and through the return line 96 to the reservoir 40.

When the steering wheel 42 is rotated in a clockwise direction, the fluid in the control circuit 12 acts in chamber 82 so as to initially shift the secondary valve member 80 to the right. As the pressure in the control circuit 12 increases, the primary valve member 78 shifts to the right but only after the secondary valve member 80 has shifted. Immediately, the valve member 78 connects the pump 38 to the motor port 72 and to the chamber 32 so as to shift the power piston 28 to the right. In order to adequately fill the inlet side of the pump 46 when turning in a clockwise direction, additional fluid is required in control circuit 12 and chamber 48 to make up for the displacement of the rod 54 when moving out of the cylinder 15. The shifting of both valve members to the right aligns the radial passage means 120 with passage means 116. This connects the return port 68 to the control port 76 so as to supply the required make-up fluid to the inlet side of the pump 46 when moving in a clockwise direction.

The back pressure restriction 122, located in the return line 96, pressurizes the control circuit 12 through the alignment of the passages 116 and 120 so as to create a back pressure to positively fill and replenish the control circuit 12. A relief valve 124 is connected between the control circuit 12 and the return line 96 and serves as a means of relieving excess pressure in the control circuit 12, such as might result from an increase in temperature.

It will now be apparent that the invention has provided an improved all hydraulic steering mechanism for many types of application, wherein power operation of the steering or controlling element is accomplished under the precise control of the operator. The system has been so designed and constructed as to eliminate the standard inflexible steering gear and related linkages and employ a power circuit and a control circuit which utilize standard hydraulic components, thereby providing a more economical, compact and rugged steering arrangement which will efficiently carry out the desired steering operation with a minimum amount of effort and attention. The system further permits the vehicle to be steered with less effort required on the part of the operator.

The system further incorporates a novel pilot operated control valve for employment with a reversible, differential follow-up motor which handles excess flow in the control circuit without the employment of a reservoir or accumulator in the control circuit.

Different power steering ratios may be obtained hydraulically by changing the volume of the pump 38 or the size of the follow-up cylinder 15.

Another feature of this invention is that one or more manual pumps may be employed in the control circuit 12 at different locations so as to permit steering from more than one position. This type of steering is frequently required in underground mine trucks as well as in certain boat applications, since the manual pump or actuator may be mounted in any position and at practically any location. The component parts may be connected by utilizing flexible hose connections.

Another desired feature is that, in the event of an emergency situation wherein a power failure has taken place in the power circuit, steering is permitted through the follow-up cylinder 15. This arrangement provides sufficient maneuverability for an emergency situation. Movement of the steering wheel 42 in either direction when steering manually will move the follow-up piston 52 so as to actuate the connecting arm 24. If the piston 52 is moved to the left, the excess displacement from the chamber 48 will return to the reservoir 40 in the same manner as when the vehicle is being steered with power. When employing manual steering, the reservoir 40 becomes the reservoir of the manual pump 46 in the manner previously described. The back pressure restriction 122 permits oil to be drawn from the reservoir for filling the control circuit 12 and compensating for the displacement of piston rod 54.

After a power failure occurs oil is required by the inlet line 94 when steering manually, since the piston 52 follows the movement of the piston 52. A safety check valve 126 is located in the power circuit 10 in between the inlet line 94 and the return line 96. The check valve 126 is ordinarily held closed by the pressure of the inlet line 94 and easily opens after the hydraulic pressure has failed in the power circuit 10 and permits circulation of oil in the power circuit 10 between the return line 96 and the inlet line 94 to either chamber 32 or 34.

While the form of embodiment of the invention as herein disclosed has been applied to a land vehicle steering system and constitutes a preferred form, it is to be understood that other forms might be adopted and would have widespread application for controlling or actuating a movable surface such as in the aircraft and missile industries. Other steering and controlling applications are in the boat and in the underground mine truck industries wherein one or a plurality of manual actuators may be utilized in the control circuit to provide steering from various strategic locations all coming within the scope of the claims which follow.

What is claimed is as follows:

1. A valve comprising: a body; a longitudinal bore in said body; a pressure port, a return port and a motor port in communication with said bore; fluid chambers at the outer ends of the bore; a first valve member in said bore for normally connecting the pressure port to the motor port; and a second valve member hydraulically related to said first valve member through said chambers, movement of both of said valve members in the same direction being effective to establish communication between one of said chambers and the return port, said pressure port being isolated from said chambers in all positions of said valve members.

2. A valve comprising: a body; a longitudinal bore in said body; a pressure port, a return port and a motor port in communication with said bore; fluid chambers at the outer ends of the bore; a first valve member in said bore for normally connecting the pressure port to the motor port; and a second valve member hydraulically related to said first valve member through said chambers, a movement of both of said valve members in the same direction being effective to establish communication between the chamber in whose direction the valve members are moved and the return port, said pressure port being isolated from said chambers in all positions of said valve members.

3. A valve comprising: a body; a longitudinal bore in said body; a pressure port, a return port and a pair of motor ports in communication with said bore; fluid chambers at the outer ends of the bore; a primary valve member in said bore for normally connecting either one of said motor ports to the pressure port and the remaining port to the return port; and a secondary valve member telescopically arranged in said primary valve member and preventing fluid flow between said chambers, movement of said secondary valve and then said primary valve in the same direction being effective to establish communication between one of said chambers and the return port, said pressure port being isolated from said chambers in all positions of said valve members.

4. A valve comprising: a body; a longitudinal bore in said body; a pressure port, a return port and a pair of cylinder ports in communication with said bore; fluid chambers at the outer ends of the bore; a primary valve member in said bore for normally connecting either one of said cylinder ports to the pressure port and the remaining port to the return port; and a secondary valve member telescopically arranged in said primary valve member and preventing fluid flow between said chambers, movement of said secondary valve member and then said primary valve member in the same direction being effective to establish communication between the chamber in whose direction the valve members are moved and the return port, said pressure port being isolated from said chambers in all positions of said valve members.

5. A valve comprising: a body; a longitudinal bore in said body; a pressure port, a return port and a pair of motor ports in communication with said bore; fluid chambers at the outer ends of the bore; a primary valve member in said bore for normally connecting either one of said motor ports to the pressure port and the remaining port to the return port; a secondary valve member telescopically arranged in said primary valve member; and radial passage means in each of said valve members, said valve members being normally biased to prevent flow between said chambers and said return port, whereby movement of both of said valve members in the same direction aligns said radial passages to establish fluid communication between one of said chambers and the return port.

6. A valve as defined in claim 5 wherein stop means are positioned at each end of the valve bore to limit the movement of the secondary valve member and insure a proper fluid connection between the radial passage means in each of the valve members when said valve members are moved in the same direction.

7. A valve as defined in claim 6 wherein said secondary valve member has a recess at each end which telescopically engages said stop means.

8. A control valve for use in a hydraulic system comprising: a body; a longitudinal bore in said body; a pressure port, a return port, and a cylinder port in communication with said bore; a primary hollow valve member movable in said bore and normally controlling flow between said cylinder port and said pressure port; a secondary valve member telescopically movable in said primary valve member, both of said valve members defining with said body a fluid chamber at the outer ends of the valve members; and a control port communicating with each of said fluid chambers for supplying fluid to one of said chambers in order to actuate said secondary valve member and then said primary valve member in the same direction and establish a continuous fluid passage between the other chamber and the return port.

9. A control valve for use in a hydraulic system including a control circuit and a power circuit, said power circuit having a fluid supply source and said control circuit having a reversible differential fluid motor and comprising: a body; a longitudinal bore in said body; a pressure port, a return port and a pair of cylinder ports communicating with said bore; inner and outer telescopically related valve members movable in said bore, the outer member normally connecting one of said cylinder ports to the pressure port and the remaining port to the return port while the inner member prevents fluid communication between the outer ends of the bore; and a pair of control ports communicating with the bore at the outer ends of the valve members, said valve members moving in the same direction in response to the control pressure at one outer end of the bore to provide fluid communication between the other outer end of the bore and the return port to handle the excess displacement from the differential fluid motor in the control circuit when the differential fluid motor is traveling in one direction or to obtain make-up fluid for the control circuit from the fluid supply source in the power circuit when the motor is traveling in the other direction.

10. A control valve for use in a hydraulic system which includes a control circuit and a power circuit and a reversible differential fluid motor in the control circuit comprising: a valve body; a longitudinal bore in said body; a pressure port, a return port and a pair of motor ports communicating with said bore and forming part of the power circuit; a pair of control ports connecting the control circuit with the bore; a primary valve member movable in said bore for controlling flow in said power circuit; and a secondary valve member hydraulically connected to said primary valve member for transferring excess flow from the control circuit to the return port in the power circuit when the fluid motor is moving in one direction or returning make-up fluid to the control circuit from the power circuit when the motor is traveling in the opposite direction.

11. In a hydraulic power transmission comprising: a power circuit and a control circuit; a manually operated actuator and a reversible follow-up cylinder of the differential type connected in said control circuit; a power source and a fluid motor connected in said power circuit; a control valve interposed in said power circuit between said power source and fluid motor; a primary valve member in said control valve for controlling fluid in the power circuit between said power source and fluid motor; and a secondary valve member telescopically disposed in said primary valve member for aiding flow in the control circuit by transferring excess flow from said control circuit to the power circuit through said control valve, when the follow-up cylinder is moved in one direction or transferring make-up fluid to the control circuit from the power circuit through said control valve when the follow-up cylinder is moved in the other direction.

12. A hydraulic power transmission comprising: a power circuit; a control circuit; an actuator and a fluid motor included in said control circuit for supplying control pressure to regulate the flow in the power circuit; a power source, a reservoir and a fluid motor connected in said power circuit; a control valve interposed in said power circuit between said power source and fluid motor; a bore in said valve; a pressure port, a return port and a motor port communicating with said bore; a first valve member movable in said bore for controlling the flow in the power circuit; a second valve member telescopically movable in said first valve member; a pair of control ports connecting said control circuit with the outer ends of said first and second valve members; return means connecting said fluid motor with said reservoir through said return port; and means forming a connection between said return means and said control circuit through said control valve when both of said valve members are moved in the same direction so as to supply make-up fluid to said control circuit from said reservoir.

13. A hydraulic power transmission comprising: a power circuit; a control circuit; an actuator and a follow-up cylinder of the differential type included in said control circuit for supplying control pressure to regulate the flow of fluid in the power circuit; a power source, a reservoir and a fluid motor connected in said power circuit; a control valve interposed in said power circuit; a longitudinal bore in said valve; a pressure port, a return port and a motor port communicating with said bore; a first valve member movable in said bore for controlling the flow in the power circuit between the power source and the fluid motor; a second valve member telescopically movable in said first valve membeer; a pair of control ports connecting said control circuit with the outer ends of said valve members; passage means provided in each of said valve members which are normally biased to prevent flow between the control circuit and the return port; return means connecting said fluid motor with said reservoir through said return port; and means forming a connection between said return means and said control circuit when both of said valve members have shifted in the same direction so as to align the passage means in said valve members, thereby providing a continuous passage between the control circuit and the return means through the control valve for delivering excess fluid in the control circuit to the return means, when the follow-up cylinder is moved in one direction or delivering make-up fluid from the reservoir to the control circuit when said follow-up cylinder is moved in the other direction.

14. A hydraulic power transmission as defined in claim 13 wherein a restriction is placed in the return means to maintain a pressure head on the control circuit through the control valve.

15. An all hydraulic combined power and manually operated transmission system comprising: an output member; a power circuit comprising a power operated pump connected to a fluid source, an actuating cylinder mechanically coupled to the output member, and a directional control valve interposed between the pump and cylinder and comprising a pair of telescoped valve members with opposing end chambers, both valve members being shiftable together in either direction by pressure fluid conducted to either chamber, one of said valve members connecting the pump and source to opposite ends of the cyinder while the other valve member coacts with the said one valve member to connect the chamber not so connected to the source through a return port of the directional valve; a control circuit comprising a follow-up cylinder of the defferential type mechanically coupled to the output member, and a manually operated reversible pump connected on opposite sides thereof to the directional valve chambers and the opposite ends of the follow-up cylinder, whereby excess fluid from and make-up fluid for the differential follow-up cylinder is transferred to and from the power circuit through the communication of one of the control valve chambers and return port thereof.

16. A hydraulic transmission defined in claim 15 wherein a restriction is placed in the power circuit between the directional control valve and the source for maintaining a pressure head on the control circuit through the directional control valve.

References Cited in the file of this patent

UNITED STATES PATENTS

| | | |
|---|---|---|
| 2,236,467 | Clench | Mar. 25, 1941 |
| 2,526,709 | Tait | Oct. 24, 1950 |
| 2,596,242 | Hill | May 13, 1952 |
| 2,600,348 | Walthers | June 10, 1952 |
| 2,702,529 | Doerfner | Feb. 22, 1955 |

FOREIGN PATENTS

| | | |
|---|---|---|
| 374,583 | Great Britain | June 16, 1932 |